Sept. 20, 1949.    C. T. McCREADY    2,482,356
VINE TURNER
Filed Oct. 21, 1946
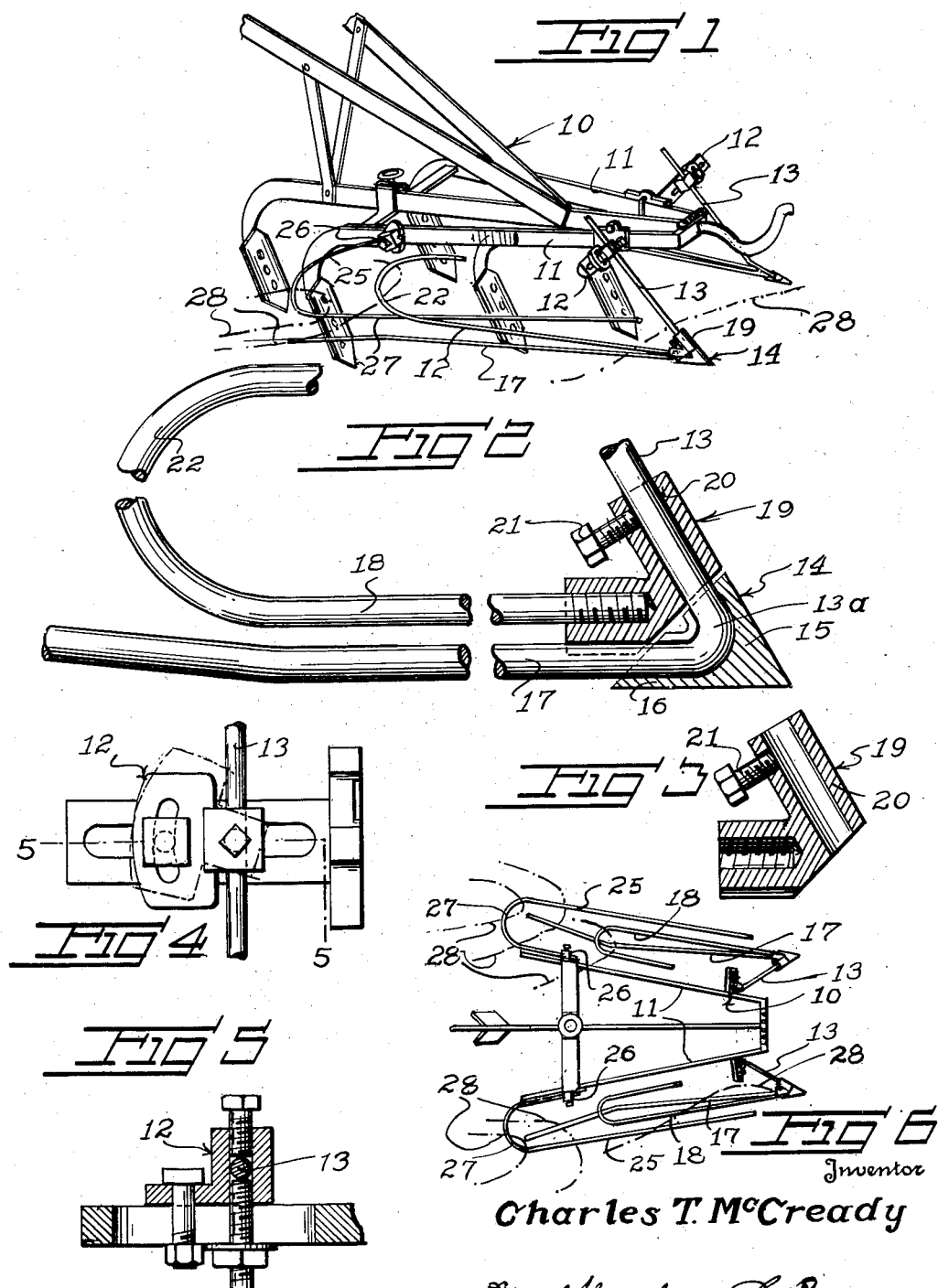
Inventor
Charles T. McCready Patented Sept. 20, 1949

2,482,356

UNITED STATES PATENT OFFICE 2,482,356

VINE TURNER

Charles T. McCready, Onley, Va.

Application October 21, 1946, Serial No. 704,640

4 Claims. (Cl. 97—192)

The present invention relates to an implement forming an attachment to a vine cultivator or in other words a vine turner for use in combination with a cultivator.

This invention is an improvement on my invention Patent No. 1,516,021 of November 18, 1924, and No. 1,563,765 of December 1, 1925.

The objects and advantages of this invention will be understood from the subjoined description with the aid of the attached drawing.

In the drawing:

Figure 1 shows a vine cultivator in perspective view with attached vine turners of this invention in position of operation;

Figure 2 a view in vertical section of the main vine turner with a supporting arm and two trailer shanks;

Figure 3 is a view of the second vine turner and its holder block;

Figure 4 a front elevation of a bracket for the securing arm in Figure 2;

Figure 5 a length section thereof on a plane along line 5—5 of Figure 4; and

Figure 6 is a diagram in plan view of the relative positions of the three pairs of vine turner shanks as secured on the cultivator 10 indicating the entanglement of several vine branches, in dot and dash lines.

In the drawing like numerals denote the same details in the different views.

Numeral 10 denotes in general a cultivator of the kind usually employed by a vine grower and numeral 11 the side bars of the cultivator frame and numeral 12 is a bracket as described in my Patent 1,562,765 for securing the arm 13 of the present turner denoted in general by numeral 14. This bracket 12 permits the raising and lowering of the carrying arm 13 as well as turning of it in the bracket and also permits lateral adjustment as described in said patent.

This invention therefore actually resides in the construction of the turner device 14 itself.

The lower end of this slanting arm 13 has a sharp bend to the rear to form the main turner shank 17 and a pointed ground digger 15 is permanently secured thereon. The same is provided with a rearward sleeve extension 16 for carrying said trailing vine turner shank 17. This ground digger point 15 is a separate forging, open on one side and folded around the bend 13a while hot to form a permanent fixture on said arm. This shank extends some distance to the rear of the digger point 15 and may be straight or preferably slightly bent as desired, as seen in Figure 1.

In addition to the shank 17 a second trailing shank is provided which is designated 18 and is secured as by threads or the like in the removable shank holder 19 and having a sleeve 20 fitting around the rod or arm 13 and secured thereon by a set screw 21, see Figure 2, so as to be adjustable up and down thereon, as well as removable therefrom in case only one trailing shank 17 is needed at a time.

While the trailing shank 17 is straight or nearly so, the shank 18 is provided with a forwardly directed crook 22 at its rear end.

Beside the two shanks 17, 18 carried on bracket 12 and universally adjustable as stated, a third shank 25 is provided on a similar bracket 26 secured further to the rear on the cultivator frame 11. This third shank 25 has a rearward bend 27 near its bracket 26 and then extends substantially in straight forward direction.

These shanks made of stout wire, are preferably provided in pairs to right and left of the frame as indicated in the diagram, Figure 6 and have the function to entangle with the vines 28 lying loose on the ground as indicated in said diagram by dot and dash lines.

It is to be understood that the invention as herein disclosed may be varied from the details described and shown without departure from the spirit of the subjoined claims.

I claim:

1. A vine turner for attachment to a cultivator having a universally adjustable bracket on the frame thereof, comprising a one piece rod bent to provide a mounting arm and a trailing shank, the arm and shank being arranged to form an acute angle, the arm being adapted to be secured to the cultivator frame by said bracket to extend forwardly and downwardly, the trailing shank extending rearwardly from the lower end of the arm, and a ground digger point comprising a solid metal body having a rear side provided with an opening in which the angle portion of said rod positions, the sides of the opening of the digger point being extended inwardly into the angle formed between the arm and the trailing shank to partially enclose the bar and secure the digger point thereto.

2. A vine turner for attachment to a cultivator having a universally adjustable bracket secured to the frame thereof, comprising a one piece rod bent to form an arm and a trailer shank disposed at an acute angle, said arm being adapted to be secured to the cultivator frame by said adjustable bracket to extend downwardly and forwardly, the trailer shank being extended rearwardly from the lower end of the arm, a digger point secured to the bar across the bend thereof, a second trailing shank comprising a bar member having one end threaded, and means for attaching the second trailer shank to said arm comprising a body formed to provide a sleeve portion through which the arm extends and an angularly disposed socketed portion which is internally screw threaded to receive the threaded end of the second shank, and means carried by said sleeve portion for securing the same to the arm.

3. A vine turner of the character described in claim 2 wherein the angular relation of said sleeve portion and said socket is approximately the same as the angular relation between the arm and the first trailing shank, the body forming the sleeve and shank having a lower end portion formed to facilitate disposing the body in close proximity to the rear side of said digger point whereby the threaded end portion of the second trailing shank may be disposed above and in close proximity to the first trailing shank.

4. In a vine turner designed for attachment to a cultivator, the novel combination and arrangement of elements comprising an arm adapted to be secured at one end to the cultivator frame to extend downwardly and forwardly, the trailing shank extending rearwardly from the lower end of said arm, said trailing shank having a rear end portion angularly disposed to extend rearwardly and laterally with respect to the line of movement of the cultivator, a second trailing shank comprising a rod secured at one end to the first rod adjacent to the point of connection between the arm and the first trailing shank, the second trailing shank extending rearwardly and laterally with respect to the forward end portion of the first trailing shank and then curving inwardly across the bend of the first trailing shank and extending forwardly upon the inner side of the first trailing shank and at an elevation above the same, and a third shank secured at one end to the cultivator frame at a substantial distance rearwardly of the point of attachment of said arm to the frame, said third shank curving outwardly and forwardly and having a long straight forward portion disposed at an elevation above the first two trailing shanks and positioned at a greater distance laterally from the cultivator frame than the first two trailing shanks and terminating at its forward end just behind the forward ends of the first mentioned trailing shanks.

CHARLES T. McCREADY.

REFERENCES CITED

The following references are of record in the file of this patent:

UNITED STATES PATENTS

| Number | Name | Date |
|---|---|---|
| 1,201,259 | Collins | Oct. 17, 1916 |
| 1,563,765 | McCready | Dec. 1, 1925 |
| 1,602,651 | Counts | Oct. 12, 1926 |